United States Patent [19]

Smith

[11] Patent Number: 5,322,389

[45] Date of Patent: Jun. 21, 1994

[54] METHOD FOR TRANSPORTING A CEMENTITIOUS MIXTURE TO AN UNDERGROUND SPACE

[75] Inventor: Charles L. Smith, Conshohocken, Pa.

[73] Assignee: Conversion Systems, Inc., Horsham, Pa.

[21] Appl. No.: 26,446

[22] Filed: Mar. 4, 1993

[51] Int. Cl.$^5$ .................... B09B 1/00; E02D 29/00
[52] U.S. Cl. .................... 405/128; 405/267; 588/252
[58] Field of Search .......... 588/252, 256, 257; 405/128, 263, 266, 267

[56] References Cited

U.S. PATENT DOCUMENTS

| | | |
|---|---|---|
| 3,927,719 | 12/1975 | Maser . |
| 4,044,563 | 8/1977 | Hurst et al. . |
| 4,205,994 | 6/1980 | Moyer, Jr. et al. . |
| 4,696,698 | 9/1987 | Harriett . |
| 4,744,700 | 5/1988 | Andy et al. . |
| 4,844,164 | 7/1989 | Shen . |
| 5,035,813 | 7/1991 | Shen . |
| 5,106,423 | 4/1992 | Clarke . |
| 5,125,455 | 6/1992 | Harris et al. . |
| 5,151,203 | 9/1992 | Riley et al. . |
| 5,168,928 | 12/1992 | Terry et al. . |

OTHER PUBLICATIONS

G. J. Kurgan, et al., "Coal Combustion by-Products Utilization Manual, vol. 1: Evaluating the Utilization Option," Michael Baker, Jr., Inc., pp. 3-41 through 3-46, (Final Rpt. Feb. 1984).

R. G. Knight, et al., "FGD By-Product Disposal Manual, Third Edition," Michael Baker, Jr., Inc., pp. 3-13 through 3-39 (Final Report Jan. 1983).

Francis C. Wright, "The Influence of High Kinetic Energy Agitation of Scrubber Sludge on Filtration at all IUCS Plants," IU Conversion Systems, Inc. R&D Report No. 41, pp. 1-7 (May 27, 1977).

J. D'Alonzo, et al., "Mixing Program-Status Report," IU Conversion Systems, Inc., Internal R&D Report No. 60, pp. 1-75 (Nov. 1979).

Charles L. Smith, "Fluid Placement Cells-Phillips Materials," IU Conversion Systems, Inc., Internal R&D Report No. 64, pp. 1-24, (Oct. 25, 1979).

Charles L. Smith, "Fluid Placement Cells-Conesville Material," IU Conversion Systems, Inc., Internal R&D Report No. 66, pp. 1-28 (Dec. 20, 1979).

Charles L. Smith, "Stabilized FGD Compositions Yield Environmentally Positive Mine Reclamation," Presented at 14th Annual Abandoned Mined Lands Conference, 11 pages (Aug. 23-27, 1992).

J. Rossoff, et al., "Disposal of By-Products From Nonregenerable Flue Gas Desulfurization Systems: Second Progress Report," EPA-600/7-77-052, pp. 44-54 (May 1977).

J. L. Crowe et al., "Processing Sludge: Sludge Characterization Studies," EPA-600/7-80-100, pp. 1-82 and Abstract (May 1980).

R. R. Lunt et al., "An Evaluation of the Disposal of Flue Gas Desulfurization Wastes in Mines and the Ocean: Initial Assessment," EPA-600/7-77-051, pp. iii, 1-6, 69-80 and 142-143 (May 1977).

Franklin A. Ayer, "Proceedings; Symposium on Flue Gas Desulfurization," EPA-600/7-78-058b, vol. II, pp. 593-615 (Nov. 1977).

*Primary Examiner*—David H. Corbin
*Attorney, Agent, or Firm*—Ratner & Prestia

[57] ABSTRACT

A method for transporting a cementitious mixture to an underground space includes subjecting the mixture to high-shear mixing to render it temporarily flowable and, while the mixture remains in its flowable state, transporting the mixture to the underground space. After a period of time following the high-shear mixing, the mixture reverts to its initial viscosity and subsequently reacts to form a cementitiously hardened product. The mixture used in the present invention includes flue gas desulfurization sludge, lime, fly ash and water.

11 Claims, No Drawings

METHOD FOR TRANSPORTING A CEMENTITIOUS MIXTURE TO AN UNDERGROUND SPACE

FIELD OF THE INVENTION

The present invention is directed to a method for facilitating placement of a cementitious mixture containing flue gas desulfurization sludge in an underground space.

BACKGROUND OF THE INVENTION

It is known to place cementitious mixtures in underground spaces for disposal and for providing resistance to potential subsidence. For example, it is known to use cementitious compositions, including flue gas desulfurization (FGD) sludge, fly ash, lime and water in this manner to provide resistance to potential subsidence. Typically, such compositions are transported into underground tunnels or mine "rooms" through vertical boreholes.

Borehole placement is dependent on the flow characteristics of the cementitious composition. For example, a composition having a relatively low viscosity (i.e., better flow characteristics) will require fewer boreholes to achieve the same void space coverage compared to a composition having a relatively higher viscosity with more boreholes. Maximizing coverage optimizes prevention of subsidence. However, the requirement for a relatively large number of vertical boreholes is a significant cost factor, minimizing the use of this otherwise environmentally and technically desirable concept.

Higher water content also renders cementitious mixtures more readily flowable to facilitate subsurface placement. Addition of water typically reduces viscosity, permits easier pumping and results in greater dispersion to subsurface voids. However, high water content compositions tend to separate after placement, leaving voids in the subsequently hardened composition. This necessitates multiple cycles of placement, separation and hardening to obtain the final fill-up condition. Additionally, higher levels of water are detrimental to the cementitious properties of the FGD waste-containing compositions. Thus, simple addition of water is not an appropriate remedy for this problem.

Unoxidized FGD wastes, which are primarily calcium sulfite as opposed to calcium sulfate, are known to tend toward plasticity or fluidity when vibrated or agitated, and then not regain a solid form. This tendency, historically, has been a negative factor in handling unoxidized FGD waste, as this characteristic results in several plant operational difficulties.

For example, an integral process in FGD waste disposal is "thickening," which is typically a primary dewatering stage from an FGD scrubber. Thickening involves depositing scrubber discharge, usually at about 5 to 10% solids, in a circular vessel with a shallow, conical bottom to allow some settling. Clear supernatent flows over the top lip of the vessel, thereby increasing the solids content of the thickener underflow. Pumping scrubber discharge from an FGD scrubber to a thickener with a pump, which imparts a high-shear force on the fluid, inhibits the calcium sulfite FGD wastes of the scrubber discharge from settling.

A similar problem occurs in the secondary dewatering stage from an FGD scrubber, typically a vacuum filter. In this stage, depending on the quality of material, the solids content exiting the secondary dewatering stage might be from 45 to 80% solids (with a composition having 25 to 50% solids exiting the primary dewatering stage). It has been found that pumped wastes are more difficult to filter.

If a composition is not sufficiently dewatered by the primary and secondary dewatering stages, several problems result. First, material is difficult to handle in this fluidized, flowable form. Further, the slightest mechanical agitation (e.g., by front end loaders or during trucking) reduces the material to its flowable state, thereby making it difficult to handle. Even after placing such material in a landfill, a problem exists. In particular, rubber-tired vehicles encounter difficulty in crossing such a surface, because these vehicles lose traction by tires applying shear stress and agitating the material to return it, on a localized basis, to the flowable state.

Although the fluid flow properties of oxidized FGD wastes (primarily calcium sulfate) are less problematic in general, the above-discussed flow characteristics for unoxidized FGD wastes (primarily calcium sulfite) are notorious. Attempts have been made to avoid the problems mentioned above caused by the shear-induced reduction in viscosity during the processing of FGD sludge. For example, it has been found that positive displacement pumps, which gently transport the material from stage to stage, minimize the shear-induced thixotropic effect.

SUMMARY OF THE INVENTION

The present invention is a method to facilitate utilization of an FGD sludge-containing mixture as a hardenable surface support material in hollow underground formations such as abandoned mines. According to this method, a flow resistant mixture of flue gas desulfurization (FGD) sludge, fly ash, lime and water is transported into an underground space, such as a room-and-pillar mine or a long-wall mine, while it is in a temporary flowable state. First, the flow resistant mixture is subjected to high-shear mixing, which temporarily renders the mixture flowable. While the mixture is still in its temporary flowable state, it is transported into the underground space. Then, the mixture is permitted to revert to its flow resistant state and subsequently to react to form a cementitiously hardened product. The resulting cementitiously hardened product provides resistance to potential subsidence. By transporting the mixture into the underground space while the mixture is still in its temporary flowable state, the mixture is capable of reaching horizontal distances heretofore unobtainable.

The underground space may be a room-and-pillar mine and the transporting step may involve pouring the mixture, while still in its temporary flowable state, down a vertical borehole and allowing horizontal spreading of the mixture in the room-and-pillar mine.

The FGD sludges useful in the present invention will typically include calcium sulfite and calcium sulfate. The lime content in the mixtures useful in the present invention may be provided by lime which is inherent from either the FGD sludge or fly ash component, or it may be lime added to the composition as calcitic, magnesian or dolomitic quicklime. The mixture should include a 0.5:1 to 3:1 ratio of fly ash to FGD sludge on a dry weight basis, 2 to 7 weight percent lime on a dry weight basis, and at least 45% solids content.

The viscosity of the mixture of the present invention immediately after being subjected to high-shear mixing should be about 25 to 40% of the viscosity of the mixture immediately after being subjected to low-shear mixing.

DETAILED DESCRIPTION OF THE INVENTION

The mixture which can be transported by the method of the present invention includes fly ash, lime, flue gas desulfurization (FGD) sludge and water.

Definition of Components of Mixture

Flue gas desulfurization (FGD) scrubber sludge is the aqueous suspension of solids generated when flue gas is desulfurized by scrubbing with alkali or alkaline earth metal compounds (most often lime or limestone). The solids content of such sludge is generally on the order of about 9% (by weight), prior to dewatering, and about 45 to 80% after dewatering. Typically, dewatering includes a primary dewatering stage (e.g., thickening) and a secondary dewatering stage (e.g., vacuum filtering). After the FGD sludge has undergone the two dewatering stages, it is referred to as "filter cake."

The sludge solids include calcium sulfite hemihydrate and calcium sulfate dihydrate. Depending on the installation design and the extent of oxidation, FGD sludge contains varying amounts of calcium sulfite hemihydrate and calcium sulfate dihydrate and water. With little oxidation, the composition of FGD sludge approaches 100% calcium sulfite and 0% calcium sulfate. On the other hand, as the extent of oxidation increases, the composition of FGD sludge approaches 0% calcium sulfite and 100% calcium sulfate. Additionally, FGD sludge may include some fly ash, excess scrubbing agent (e.g. lime) and the like.

Sludge content in compositions of the present invention is measured on a dry weight basis and the amount of sludge which may be used in mixtures for purposes of the present invention is expressed by a fly ash:FGD sludge ratio or a fly ash:filter cake ratio (expressed as a ratio of dry weight). Because this ratio is measured on a dry weight basis, it will remain constant for a given sample of FGD sludge, regardless of the dewatering stage from which the sample is withdrawn.

Fly ash is the fine, dry, particulate pozzolanic material emitted with the exhaust gas from a pulverized coal burning combustion unit. Because it is a pozzolan, fly ash can combine with water and an alkaline earth material, such as lime, to yield a cementitious reaction. Fly ash is generally separated from flue gases by the use of a mechanical collector or an electrostatic precipitator. Fly ash, for purposes of the present invention, may also comprise the fine ash recovered from the stack gases of oil combustion units or trash incinerators, to the extent these ashes are or may be pozzolanic. The minimum proportion of fly ash or other pozzolanic material required will depend on the pozzolanic activity of that material, which is measurable in accordance with the ASTM C-593 testing method. Based on the pozzolanic activity of a typical bituminous pulverized coal combustion ash (collected electrostatically), the hardenable composition used in the method of the present invention should include at least 10% (dry weight basis, exclusive of lime) of such ash.

Possible substitutes for fly ash include coal mine refuse or tailings, "red mud" resulting from the chemical reduction of bauxite, alum waste, or essentially any highly amorphous siliceous or alumino siliceous incineration residue. These materials may be substituted to the extent they contribute the amount of pozzolanic activity normally contributed by the fly ash.

The term "lime" includes calcium oxide, or calcium oxide plus magnesium oxide (known as quicklime) as well as calcium hydroxide, or calcium hydroxide plus magnesium oxide or hydroxide (known as hydrated lime). Part or all of the required "lime" may be provided by other lime-contributing compositions, such as by-product forms of quicklime or hydrated lime (e.g. acetylene, Portland cement or lime production by-products). The term "lime" should be distinguished from the term "limestone", which refers to naturally occurring limestone, or dolomite generally consisting of calcium carbonate, or mixtures of calcium carbonate and magnesium carbonate.

Lime quantities indicated herein are calculated as calcium quicklime on a dry weight basis. To the extent the lime reactant includes calcium hydroxide, magnesium oxide or hydroxide or other substitute lime contributors, the equivalent proportions thereof are determined by the conventional method for determining available calcium oxide. The conventional method for determining available calcium oxide is disclosed in American Society for Testing and Materials Designation C 25-91, Section 33.

The amount of lime required must be that sufficient to carry out the cementitious reaction between lime, fly ash and FGD sludge. This depends on the concentrations of the other constituents and the pozzolanic activity of the fly ash. Generally, the minimum amount of total available lime should be about 2% (dry weight basis). In some cases, there may be sufficient lime in either the fly ash component or intrinsic in the FGD sludge component to achieve this minimum amount. In other cases however, lime must be added to achieve the minimum amount. As the lime content increases, the cementitious reaction occurs more readily. Although no clear maximum has been determined for lime content, it appears that lime contents of above about 7% are not economically worthwhile.

The final component of the mixture is water. Water may be inherent in any of the other three components of the mixture. However, it has been found that water should be added so that the solids content is 45%, at the lowest. As used herein, solids content refers to the weight of the solids of the mixture divided by the total weight of the mixture. At solids contents below 45%, it appears that the effect of the high-shear mixing to reduce the viscosity of the mixture is not very significant.

Industrial Utility

The primary use of the present invention is to facilitate transporting a mixture of FGD sludge, fly ash, lime and water to an underground space. The viscosity of the mixture is temporarily decreased by high shear mixing and then transported in that temporary state. Because of this, the mixture flows better and is capable of spreading at a greater horizontal distance than previously. Thus, more void space is filled per vertical borehole.

Composition and Method Details

The present invention is a method for transporting a flow resistant mixture of flue gas desulfurization (FGD) sludge, fly ash, lime and water into an underground space by first subjecting the mixture to high shear mixing, which temporarily renders the mixture flowable. Then, the mixture is transported into the underground space while it is still in its temporary flowable state. After a period of time, the mixture reverts to its initial flow resistant state and subsequently reacts to form a cementitiously hardened product. This cementitiously hardened product resists potential subsidence.

Before high shear mixing, the mixture is flow resistant, which generally refers to sludges considered thixotropic and usually having an angle of repose (defined below) greater than 20°. A mixture's angle of repose, which is a good measure of flowability, is the angle between a horizontal line parallel to the ground and a line parallel with the sloped surface of a pile of the mixture from the outer edge of the pile to the top of the pile. Thus, a lower angle of repose represents a flatter pile and a more flowable mixture. For purposes of the present invention, a mixture is "flowable" if it has an angle of repose less than 10°.

While in its flowable state, the mixture has already been subjected to high shear mixing and has a reduced viscosity from its initial viscosity. The desired absolute value of viscosity (in centipoise) varies with the particular application and depends on such factors as the number of boreholes for a given area of underground space, the flow path of the underground space and the thickness and flow path of the borehole. However, it is believed that a viscosity (immediately after high-shear mixing) below approximately 40,000 centipoise is acceptable for most applications and results in a sufficiently flowable mixture.

In its initial state (before mixing), the mixture appears to be "thixotropic." That is, the viscosity of the mixture decreases when the mixture is subjected to high-shear mixing, then solidifies again when left standing. However, it has been discovered that mixtures used in the present invention are flowable for a period of time after being subjected to high-shear mixing. The viscosities of mixtures of the present invention do not immediately increase after no longer being subject to high-shear mixing. Only after a certain period of time, the mixture reverts to its initial viscosity. It is this delayed "memory" which serves the purposes of the present invention by: (1) facilitating the transporting of the mixture to the underground space and (2) permitting a cementitiously hardened product to form in the underground space.

For purposes of the present invention, the term "high-shear mixing" is that level of mixing which renders a flow resistant mixture flowable. To date, the actual step of high-shear mixing has only been carried out on an experimental scale. A Waring-type blender (AMC Model 9-911-6), operated at a higher speed, has been used as the source of the high-shear mixing. The effect of the Waring-type blender is to impart a substantial amount of mixing force to the mixture, which causes the suspensions to be intimately mixed. Individual agitation and dispersion to intimately mix the material is required to induce the thixotropic effect. High-shear mixing is contrary to what has been used in the past to avoid the thixotropic effect of the mixture. For example, positive displacement pumps, which gently move a pocket of material along without intimate mixing, have been used to avoid the very effect which is desired in this invention.

Any conventional mixer which can impart the degree of mixing force per unit volume of mixture similar to that imparted by the Waring-type blender will be adequate to serve as the high-shear mixing source. For example, centrifugal pumps, pin mixers or high speed turbine mixers are believed to be viable options. Another mixer which can also serve this purpose is described in a U.S. patent application for AN IMPROVED PUG MILL MIXER, Ser. No. 07/984,907, invented by John H. Juzwiak and assigned to Conversion Systems, Inc. This patent application, incorporated herein by reference, discloses an improved pug mill mixer including at least one homogenizer shaft extending in a direction transverse to the pug mill shafts and rotating at a relatively high speed for providing a section of high-shear mixing. In this mixer, the pug mill shafts may rotate at approximately 25 to 100 rpm, while the homogenizer shafts may rotate at approximately 800 to 1500 rpm.

The second step of the present invention is transporting the mixture while it is still in its temporary flowable state into the underground space. Typically, the underground space is an abandoned mine, such as a room-and-piller mine, a long-wall mine, a mine shaft or even a vertical borehole which leads to the mine. In most cases, the step of transporting the mixture involves pouring the mixture down the vertical borehole and allowing horizontal spreading of the mixture in the mine.

The transporting step should be carried out while the mixture is still in its temporary flowable state. Depending on the components of the mixture and the extent of high-shear mixing, the time during which the mixture retains its flowable state varies. In several of the examples below, the mixture has improved flow characteristics even after twenty hours from the time it was subjected to high-shear mixing.

The third step of the present invention is to simply permit the mixture to revert to its thixotropic state and subsequently to react to form a cementitiously hardened product in a well known manner. Once again, the time required for the mixture to revert to its thixotropic state depends on the amounts of the components of the mixture and the extent of high-shear mixing. As demonstrated by the examples below, there appears to be some amount of cementitious reaction before the mixture fully reverts to its initial thixotropic state and its initial viscosity. The resulting cementitiously hardened product is relatively high in compressive strength, thereby resisting potential subsidence of the earth above the mine.

In conclusion, the method of the present invention takes advantage of the viscosity "memory" of a mixture of fly ash, FGD sludge, lime and water. Because of this memory, the mixture can be easily placed in a mine for a period of time after high-shear mixing, but subsequently reverts to its initial viscosity and reacts to form a cementitiously hardened product, which resists subsidence.

EXAMPLES

The following illustrative examples are included to more clearly demonstrate the overall nature of the invention.

EXAMPLE I

Several compositions of the present invention were prepared, then subjected to low-shear and high-shear mixing, then measured for viscosity. The compositions and results are shown below at Table 1.

TABLE 1

| Composition # | 1 | 2 | 3 (No lime) | 4 | 5 (Only filter cake) |
|---|---|---|---|---|---|
| Solids content (%) | 56.3 | 51 | 51 | 45 | 52.4 |
| Low Shear | | | | | |
| Viscosity - immediate (cps) | 370,000 | 117,000 | 98,000 | 4,680 | 600,000 |
| Viscosity - 20 hours (cps) | 585,000 | 270,000 | 136,000 | 109,200 | |
| Supernatent - 20 hours (Volume % of original) | 6.25 | 10.4 | 10.4 | 16.7 | |
| High Shear | | | | | |
| Viscosity - immediate (cps) | 136,000 | 47,000 | 27,300 | 4,580 | 175,000 |
| Viscosity - 20 hours (cps) | 585,000 | 270,000 | 98,000 | 54,600 | |
| Supernatent - 20 hours (Volume % of original) | 6.25 | 10.4 | 12.5 | 23.9 | |

All of these test compositions (1 through 5) were prepared by mixing filter cake with fly ash from a specific commercial installation. The filter cake was the product of two stages of dewatering of FGD sludge from the same commercial installation. The filter cake had a 52.4% solids content of which approximately 94% was calcium sulfite hemihydrate and approximately 5% was calcium sulfate dihydrate, as well some amount of fly ash, lime and scrubbing agents. The FGD sludge was approximately 6% oxidized, and the fly ash to filter cake ratio for Composition Numbers 1 through 4 was 1:1, on a dry weight basis. Composition Number 5 included no fly ash.

Also, 3% quicklime (dry weight basis) was added to Compositions 1, 2 and 4. The quicklime used was calcium oxide, minus #10 mesh, of normal commercially available purity. No lime was added to Compositions 3 or 5. As can be seen from Table 1, Composition 1 was adjusted to 56.3% solids content, Compositions 2 and 3 were adjusted to 51% solids content, Composition 4 was adjusted to 45% solids content, and Composition 5 was adjusted to 52.4% solids content. The solids content represents the percent solids divided by the total weight. These adjustments were made by the addition of water.

The low-shear mixing was accomplished by subjecting the mixture to a Hobart Mixer, Model N-50, which is a five quart planetary mixer specified in various American Society for Testing and Material specifications. The mixing time was 30 seconds. The high-shear mixing was accomplished by subjecting the mixture to five minutes in a Waring-type Blender (AMC Model 9-911-6) operated at a higher speed, namely on the "liquify" setting.

Viscosity measurements were made immediately after mixing and twenty hours after mixing. Viscosities of non-Newtonian fluids discussed herein were measured using a Brookfield Model LVT Viscosimeter, with a helipath attachment. Viscosities were determined in three inch diameter, six inch height containers. Readings at twenty hours after mixing were taken in the suspended solids, without agitating to reincorporate the aqueous supernatent.

As can be seen from comparing the viscosities immediately after the mixtures were subjected to high-shear mixing to the viscosities immediately after the mixtures were subjected to low-shear mixing, the high-shear mixing significantly reduces the viscosity, thereby rendering the mixture flowable. For example, the viscosity of the mixture subjected to high-shear mixing was 36.8% of that of the mixture subjected to low-shear mixing immediately after mixing. Analogous percentages for Compositions 2 through 5 are 40.2%, 27.9%, 97.9% and 29.2%, respectively.

After twenty hours, the viscosities of the mixtures subjected to high-shear mixing approached the viscosities of the mixtures subjected to low-shear mixing. At lower water contents, i.e. 45% solids content, a significant amount of supernatent formed in both the mixture subjected to the high-shear mixing and the mixture subjected to the low-shear mixing. However, as the water content increased, the supernatent became more prevalent in the mixture subjected to high-shear mixing.

Several additional measurements were taken for Composition 2. For example, the angle of repose was measured for each mixture. The angle of repose for the mixture subjected to low-shear mixing was 10°, while that for the mixture subjected to high-shear mixing was only 2°. Also, the area spread for equal volumes was 57% greater for the mixture subjected to high-shear mixing for Composition 2. The column flow in a three inch diameter horizontal column was 24% greater for the mixture subjected to the high-shear mixing. The column flow for a three inch diameter 3° down from the horizontal was 67% greater for the mixture subjected to high-shear mixing.

EXAMPLE II

An oxidized filter cake composition was prepared, subjected to varying amounts of mixing and then measured for viscosity immediately after mixing and twenty hours after mixing. The results of these tests are given in Table 2.

TABLE 2

| Extent of Mixing | Low Shear | High Shear |
|---|---|---|
| Viscosity - immediate (cps) | 250,000 | 15,600 |
| Viscosity - 20 hours (cps) | 600,000 | 45,000 |

The composition used to generate Table 2 included FGD filter cake from another commercial installation. This filter cake had a 84.9% solids content, which was predominantly calcium sulfate dihydrate. Also, fly ash (from the same commercial installation) was used and 2% minus #10 mesh quicklime (dry weight basis) was added. The fly ash to filter cake ratio was 0.75:1 (dry weight basis). Water was added to adjust the mixture to 70.1% solids content.

The mixing for both high-shear mixing and low-shear mixing was applied in the same manner as disclosed in Example I. Also, viscosity was measured immediately after mixing and twenty hours after mixing in the same manner as disclosed in Example I.

As can be seen from comparing the viscosity of the mixture subjected to high-shear mixing with that of the mixture subjected to low-shear mixing, the high-shear mixing significantly reduces viscosity. For example, immediately after mixing, the viscosity of the mixture subjected to high-shear mixing was 6.2% that of the mixture subjected to low-shear mixing. Even after twenty hours, the mixture subjected to the high-shear mixing was still flowable, as it was only 7.5% the viscosity of the mixture subjected to low-shear mixing. Further, even after twenty hours, the mixture subjected to high-shear mixing had a viscosity of only 45,000 cps.

While this invention has been disclosed with reference to specific embodiments, it is apparent that other embodiments and equivalent variations of this invention may be devised by those skilled in the art without departing from the true spirit and scope of this invention. The appended claims are intended to be construed to include all such embodiments and equivalent variations.

What is claimed:

1. A method for transporting a flow resistant mixture of flue-gas desulfurization sludge, fly ash, lime and water into an underground space by:
    subjecting said mixture to high-shear mixing to temporarily render said mixture flowable;
    transporting said mixture, while still in its flowable state, into the underground space; and
    after said transporting step, permitting said mixture to react to form a cementitiously hardened product.

2. A method in accordance with claim 1 wherein said underground space is a room-and-pillar mine and the transporting step involves pouring said mixture, while still in its flowable state, down a bore hole and allowing horizontal spreading of said mixture in said room-and-pillar mine.

3. A method in accordance with claim 1 wherein said flue-gas desulfurization sludge predominantly includes calcium sulfate.

4. A method in accordance with claim 1 wherein said flue-gas desulfurization sludge predominantly includes calcium sulfite.

5. A method in accordance with claim 1 wherein the lime is intrinsic to at least one of the fly ash and the flue-gas desulfurization sludge.

6. A method in accordance with claim 1 wherein the lime is added in the form of calcium quicklime.

7. A method in accordance with claim 1 wherein said mixture includes:
    a 0.5:1 to 3:1 ratio of fly ash to flue-gas desulfurization sludge on a dry weight basis;
    2 to 7 weight percent lime on a dry weight basis; and
    at least 45 percent solids.

8. A method in accordance with claim 8 wherein said mixture has a viscosity, immediately after subjected to high-shear mixing, of about 25% to 40% of its viscosity immediately after subjected to low-shear mixing.

9. A method in accordance with claim 1 wherein said mixture has an angle of repose, immediately after subjected to high-shear mixing, of less than 10°.

10. A method in accordance with claim 9 wherein said mixture has an angle of repose, immediately after subjected to high-shear mixing, of about 2°.

11. A method in accordance with claim 1 wherein said mixture has a viscosity, immediately after subjected to high-shear mixing, of below approximately 40,000 centipoise.

* * * * *

UNITED STATES PATENT AND TRADEMARK OFFICE
CERTIFICATE OF CORRECTION

PATENT NO.   : 5,322,389
DATED        : June 21, 1994
INVENTOR(S)  : Charles L. Smith It is certified that error appears in the above-indentified patent and that said Letters Patent is hereby corrected as shown below:

Column 10, claim 8, line 20, after "with claim" delete "8" and insert therefor --7--.

Signed and Sealed this

Eighteenth Day of October, 1994

Attest:

BRUCE LEHMAN

*Attesting Officer*          *Commissioner of Patents and Trademarks*